United States Patent
Nagata

Patent Number: 5,805,099
Date of Patent: Sep. 8, 1998

[54] SYNTHETIC APERTURE RADAR AND TARGET IMAGE PRODUCTION METHOD

[75] Inventor: Hidefumi Nagata, Tokyo, Japan

[73] Assignee: NEC Corporation, Tokyo, Japan

[21] Appl. No.: 771,905

[22] Filed: Dec. 23, 1996

[30] Foreign Application Priority Data

Dec. 26, 1995 [JP] Japan .................................. 7-338978

[51] Int. Cl.⁶ .................................................. G01S 13/90
[52] U.S. Cl. ........................... 342/25; 342/190; 342/194; 342/197
[58] Field of Search ............................ 342/25, 190, 194, 342/195, 197

[56] References Cited

U.S. PATENT DOCUMENTS

| | | | |
|---|---|---|---|
| 4,616,227 | 10/1986 | Homma et al. | 342/25 |
| 4,723,124 | 2/1988 | Boles | 342/25 |
| 4,748,448 | 5/1988 | Thompson | 342/26 |
| 4,758,838 | 7/1988 | Maeda et al. | 342/25 |
| 5,179,383 | 1/1993 | Raney et al. | 342/25 |
| 5,191,344 | 3/1993 | Moreira | 342/25 |
| 5,237,329 | 8/1993 | Bamler et al. | 342/25 |
| 5,307,070 | 4/1994 | Runge et al. | 342/25 |
| 5,469,167 | 11/1995 | Polge et al. | 342/25 |
| 5,546,084 | 8/1996 | Hindman | 342/25 |
| 5,608,404 | 3/1997 | Burns et al. | 342/25 |
| 5,627,543 | 5/1997 | Moreira | 342/25 |

FOREIGN PATENT DOCUMENTS 61-193086  8/1986  Japan .

OTHER PUBLICATIONS

M.J. Prickett et al.; "Principles of Inverse Synthetic Aperture Radar (ISAR) Imaging"; IEEE (1980); pp. 340–345.

Y. Ishii et al., "A Study on Digital Image Reconstruction of SAR Data"; NIHON remote sensing GAKKAI–SHI, vol. 2, No. 3, 1982, pp. 63–77.

*Primary Examiner*—John B. Sotomayor
*Attorney, Agent, or Firm*—Whitham, Curtis & Whitham

[57] ABSTRACT

A synthetic aperture radar apparatus which analyzes Doppler frequency displacements arising from a range direction motion component of a target and motion components of a flying body to produce a motion target image wherein only azimuth direction motion components of the target are converted into Doppler components. An SAR apparatus wherein SAR reproduction processing is performed based on target information obtained from a reflected wave received from a target and flying information of a flying body includes a recording and reproduction unit for recording the target information and reproducing the data in a designated range, and a moving target processor for analyzing Doppler frequency displacements arising from a range direction motion component of the target and motion components of the flying body from the reproduced data and producing a moving target image wherein only azimuth direction motion components of the target are converted into Doppler components.

7 Claims, 6 Drawing Sheets

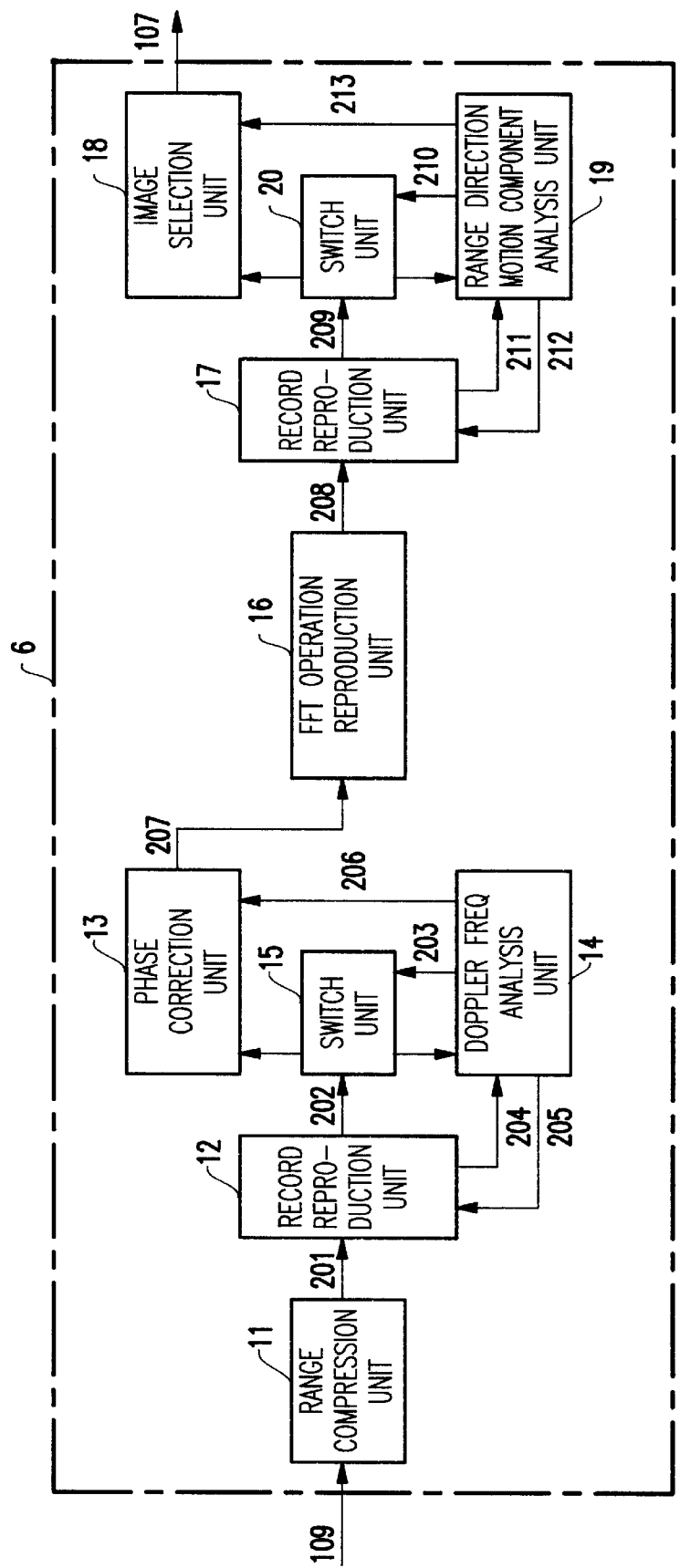

SYNTHETIC APERTURE RADAR AND TARGET IMAGE PRODUCTION METHOD

BACKGROUND OF THE INVENTION (1) Field of the Invention

This invention relates to a synthetic aperture radar (SAR) apparatus carried on a flying body (platform) such as an aircraft, and more particularly to an SAR apparatus which can produce an image of a moving target such as a marine vessel. The present invention relates also to a target image production method which can produce an image of such moving target.

(2) Description of the Prior Art

A synthetic aperture radar (SAR) apparatus of the type mentioned is constructed such that a radio wave is radiated from an antenna provided on a vessel toward a target on the ground and a reflected wave of it is received by the antenna to acquire information regarding the target and then an image of the target is produced based on the acquired information. In the apparatus just described, a pulse compression technique and a synthetic aperture technique are utilized in order to augment the distance (range) resolution and the azimuth resolution. The SAR apparatus having such a construction as just described is used in order to image a target fixed on the ground and, to this end, decomposes the target into azimuth direction components and produces an image using variations of Doppler frequencies which arise from motion of the platform.

In recent years, also an inverse SAR (ISAR) apparatus has been put into practical use wherein the platform is kept in a fixed state and movements (pitching, rolling and yawing) of a moving target such as a marine vessel are observed to image the target. FIG. 1 illustrates a principle of imaging of a moving target.

If a radio wave of center frequency $F_C$ is sent out from radar 101 while target 100 is rotating at angular velocity $\omega$, then Doppler frequency $F_D$ represented by the following expression is observed at a location spaced by r from the center of rotation of target 100:

$$F_D = 2(\omega \div c) F_C \cdot r = G(r, \omega) \qquad (1)$$

where c is the light velocity, and G is a function indicating $F_D$.

According to expression (1) above, where $\omega$ is fixed, $F_D$ is represented by a function of r. Accordingly, if Fast Fourier Transform (FFT) in azimuth directions and mapping are performed for received data, then an image can be obtained in accordance with distance r. A moving target can be imaged this manner.

By the way, in recent years, a strong request to make it possible to identify a marine vessel or a like object from an aircraft or a like flying body is developed particularly in the field of defense, and it is required to produce a detailed image of a moving target.

Such imaging of a moving target as described above is difficult with such conventional SAR apparatus which are constructed so as to image a fixed target on the ground or the sea as described above.

Further, with an ISAR apparatus, since it is presumed that the platform is fixed, it is normally difficult to image data acquired from a flying body such as an aircraft. The reason is described below.

If the platform moves, then Doppler frequency $F_D$(TOTAL) observed will include components of Doppler frequency $F_D$(aircraft) which arise from a movement of the aircraft in addition to Doppler frequency $F_D$(target) arising from the motion of the target as seen from following expression (2). It is difficult to remove the components of Doppler frequency $F_D$(aircraft).

$$F_D(\text{TOTAL}) = F_D(\text{target}) + F_D(\text{aircraft}) \qquad (2)$$

Further, Doppler frequency $F_D$(TOTAL) mentioned above is actually represented, where the flying body advancing direction is represented by x, the flying body vertical direction is represented by z and the flying body perpendicular direction is represented by y, by following expression (3) due to movements of the target around the three axes:

$$F_D(\text{TOTAL}) = Gx(rx, \omega x) + Gy(ry, \omega y) + Gz(rz, \omega z) + F_D(\text{aircraft}) \qquad (3)$$

where Gx, Gy and Gz are functions of $F_D$ around the axes, and Gx(rx, $\omega$x) is a range direction component, and Gy(ry, $\omega$y) and Gz(rz, $\omega$z) are azimuth direction components. Since Doppler frequency FD(target) includes a range direction component and azimuth direction components in this manner, even if the Doppler frequency $F_D$(aircraft) is removed, the range direction component becomes an issue in conversion of the azimuth direction into a frequency, and it still is difficult to image a moving target.

It is to be noted that, owing to the augmentation of the oscillation correction technique of an aircraft in recent years, also an ISAR apparatus which can be carried on an aircraft and can image a target has been developed. However, since this apparatus is used only for ISAR processing, it cannot be used commonly with an SAR apparatus, which makes the construction of the entire system expensive and complicated.

SUMMARY OF THE INVENTION

It is an object of the present invention to provide a synthetic aperture radar apparatus and a target image production method which, solving the problems described above, can image a moving target with a simple construction.

In order to attain the object described above, according to the present invention, there is provided a synthetic aperture radar apparatus which includes an antenna block provided on a flying body for radiating a radio wave toward a target and receiving a reflected wave of the radio wave to acquire information regarding the target. Flying information detection means detects flying information of the flying body. SAR reproduction processing means effects SAR reproduction processing based on the target information acquired by said antenna block and the flying information detected by said flying information detection means. A result of the SAR reproduction processing of said SAR reproduction processing means is displayed and recorded.

The recording and reproduction means records the target information acquired by said antenna block and reproduces the data in a designated range from the recorded information. Moving target processing means analyzes Doppler frequency displacements arising from a range direction motion component of the target and motion components of the flying body from the data reproduced by the recording and reproduction means and produces a moving target image wherein only azimuth direction motion components of the target are converted into Doppler components. The displaying and recording means outputs a predetermined range designated from within the display of the SAR reproduction processing means which includes the target as a designated range to said recording and reproduction means so as to effect display and recording of the motion target image produced by said moving target processing means.

In the synthetic aperture radar apparatus described above, the moving target processing means may include range compression processing means for effecting compression in the range direction of the data reproduced by said recording and reproduction means. The moving target processing means may also include correction means for analyzing Doppler frequency displacements arising from motion components of the flying body from the range compression data compression processed by said range compression processing means to effect phase correction of the range compression data. The moving target processing means may also include image production means for converting azimuth direction motion components of the range compression data corrected by said correction means into Doppler components to produce motion target images at a plurality of successive times. The moving target processing means may also include selection means for analyzing the Doppler frequency displacements arising from the range direction motion components from the moving target images at the successive times produced by said image production means to select a moving target image which exhibits a minimum one of the displacements.

In this instance, the synthetic aperture radar apparatus may be constructed such that said correction means includes compression result recording and reproduction means for recording results of the compression processing of said range compression processing means in a time series and reproducing the recorded data in response to a reproduction control signal. The correction means also includes first switching means for switching a destination of outputting of said compression result recording and reproduction means in response to a switching control signal. The correction means also includes Doppler frequency analysis means for analyzing the Doppler frequency displacements arising from the motion components of the flying body based on the range compression data reproduced by said compression result recording and reproduction means. The correction means also includes phase correction means for effecting phase correction of the range compression data reproduced by said compression result recording and reproduction means based on results of the Doppler frequency analysis effected by said Doppler frequency analysis means.

The selection means includes image recording and reproduction means for recording the moving target images at the different times produced by said image production means in a time series and reproducing the recorded moving target images in response to a reproduction control signal. The selection means also includes second switching means for switching a destination of outputting of said image recording and reproduction means in response to a switching control signal. The selection means also includes range direction rotational motion analysis means for analyzing Doppler frequency displacements arising from the range direction motion components from the moving target images reproduced by said image recording and reproduction means and outputting a time of an intermediate displacement in a displacement section which is defined by a maximum value and a minimum value of the displacements. The selection means also includes image selection means for selecting an image at the time outputted from said range direction rotational motion analysis means from among the moving target images reproduced by said image recording and reproduction means.

The Doppler frequency analysis means outputs, when a recorded amount of the compression result recording and reproduction means reaches a predetermined amount, a reproduction control signal to the compression result recording and reproduction means to effect reproduction of the recorded data and further outputs a switching control signal to the first switching means to switch the destination of outputting of said compression result recording and reproduction means to said Doppler frequency analysis means, but outputs, when the Doppler frequency analysis is performed, a switching control signal to the first switching means to switch the destination of outputting of said compression result recording and reproduction means to said phase correction means and further outputs a reproduction control signal to said compression result recording and reproduction means to effect re-reproduction of the recorded data.

The range direction rotational motion analysis means outputs, when the recorded amount of the image recording and reproduction means reaches the predetermined amount, a reproduction control signal to the image recording and reproduction means to effect reproduction of the recorded data and further outputs a switching control signal to the second switching means to switch the destination of outputting of the image recording and reproduction means to the range direction rotational motion analysis means, but outputs, when the range direction rotational motion analysis is effected, a switching control signal to the second switching means to switch the destination of outputting of the image recording and reproduction means to the selection means and further outputs a reproduction control means to the image recording and reproduction means to effect re-reproduction of the recorded.

Further, in order to attain the object described above, according to the present invention, a first target image reproduction method wherein a radio wave is radiated from a flying body toward a target and a reflected wave of the radio wave is received to acquire information regarding the target, and a target image is produced from the acquired target information and flying information regarding the flying body, is constructed such that Doppler frequency displacements arising from a range direction motion component of the target and motion components of the flying body are analyzed to produce a target image wherein only azimuth direction motion components of the target are converted into Doppler components.

According to the present invention, a second target image reproduction method wherein a radio wave is radiated from a flying body toward a target and a reflected wave of the radio wave is received to acquire information regarding the target, and a target image is produced from the acquired target information and flying information regarding the flying body. This method includes as a first step of recording the target information. In the second step, SAR reproduction processing is effected based on the target information and the flying information. In the third step, a target range from an image SAR reproduced in the second step is designate. In the fourth step, from the target information stored in the first step, data corresponding to the target range designated in the third step is reproduced. In the fifth step, Doppler frequency displacements arising from range direction motion components of the target and motion components of the flying body are analyzed from the data reproduced in the fourth step to produce a motion target image wherein only azimuth direction motion components of the target are converted into Doppler components.

According to the present invention, a third target image reproduction method wherein a radio wave is radiated from a flying body toward a target and a reflected wave of the radio wave is received to acquire information regarding the target, and a target image is produced from the acquired target information and flying information regarding the flying body. In the first step of this method the target information is recorded. In the second step, SAR reproduction processing is effected based on the target information and the flying information. In the third step, a target range from an image SAR reproduced in the second step is designated. In the fourth step, from the target information stored in the first step, data corresponding to the target range designated in the third step is reproduced. In the fifth step, compression in a range direction of the data reproduced in the fourth step and Doppler frequency displacements arising from the motion components of the flying body from the compressed processed range is data is analyzed to effect phase correction of the range compression data. In the sixth step, the azimuth direction motion components of the range conversion data phase corrected in the fifth step is converted into Doppler components to produce motion target images at a plurality of successive times. In seventh step, the Doppler frequency displacements arising from the range direction motion components of the motion target images at the different times produced in the sixth step are analyzed to select a motion target image which exhibits a minimum one of the displacements.

In the target image production method described above, the selection of a motion target image in the seventh step may be performed by selecting an image of an intermediate displacement in a displacement section which is defined by a minimum one and a maximum one of the Doppler frequency displacements arising from the range direction motion component.

According to the present invention constructed in such a manner as described above, a moving target can be imaged merely by additionally providing the recording and reproduction means and the moving target processing means newly to a conventional SAR apparatus which includes an antenna block, flying information detection means, SAR reproduction processing means and displaying and recording means. Consequently, a complicated apparatus construction is not required.

Further, in the present invention, target information from the antenna block is range compressed, and Doppler frequency displacements arising from motion components of the flying body are analyzed from the range compressed data to correct the phase of the range compressed data. Then, azimuth direction components of the phase compressed range compression data are converted into Doppler components to produce moving target images. Consequently, the thus produced moving target images do not include the motion components of the flying body.

Further, the Doppler frequency displacements arising from the range direction components of the thus produced moving target images are analyzed to select a moving target image from within the moving target images at different times so that it may have a minimum displacement. Since the moving target image selected in this manner is displayed, the moving target image obtained includes little range direction components.

Accordingly, according to the present invention, the following effects can be achieved.

(1) A moving target can be imaged with such a simple construction that a conventional SAR apparatus additionally includes recording and reproduction means and moving target processing means.

(2) Since a moving target image wherein only azimuth direction components are converted into Doppler components, the moving target can be analyzed accurately, and the present invention can satisfy a demand for recognition or detailed imaging of a marine vessel or the like from an aircraft or the like.

BRIEF DESCRIPTION OF THE DRAWINGS

In the accompanying drawing(s):

FIG. 3 is a block diagram showing an example of a construction of a moving target processing unit;

DESCRIPTION OF THE PREFERRED EMBODIMENTS

An embodiment of the present invention is described below with reference to the drawings.

Figure 1:
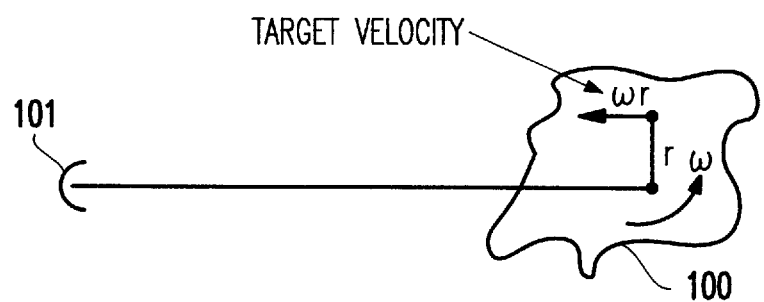
FIG. 1 is a schematic view illustrating a principle of imaging of a moving target by a conventional synthetic aperture radar apparatus.
Figure 2:
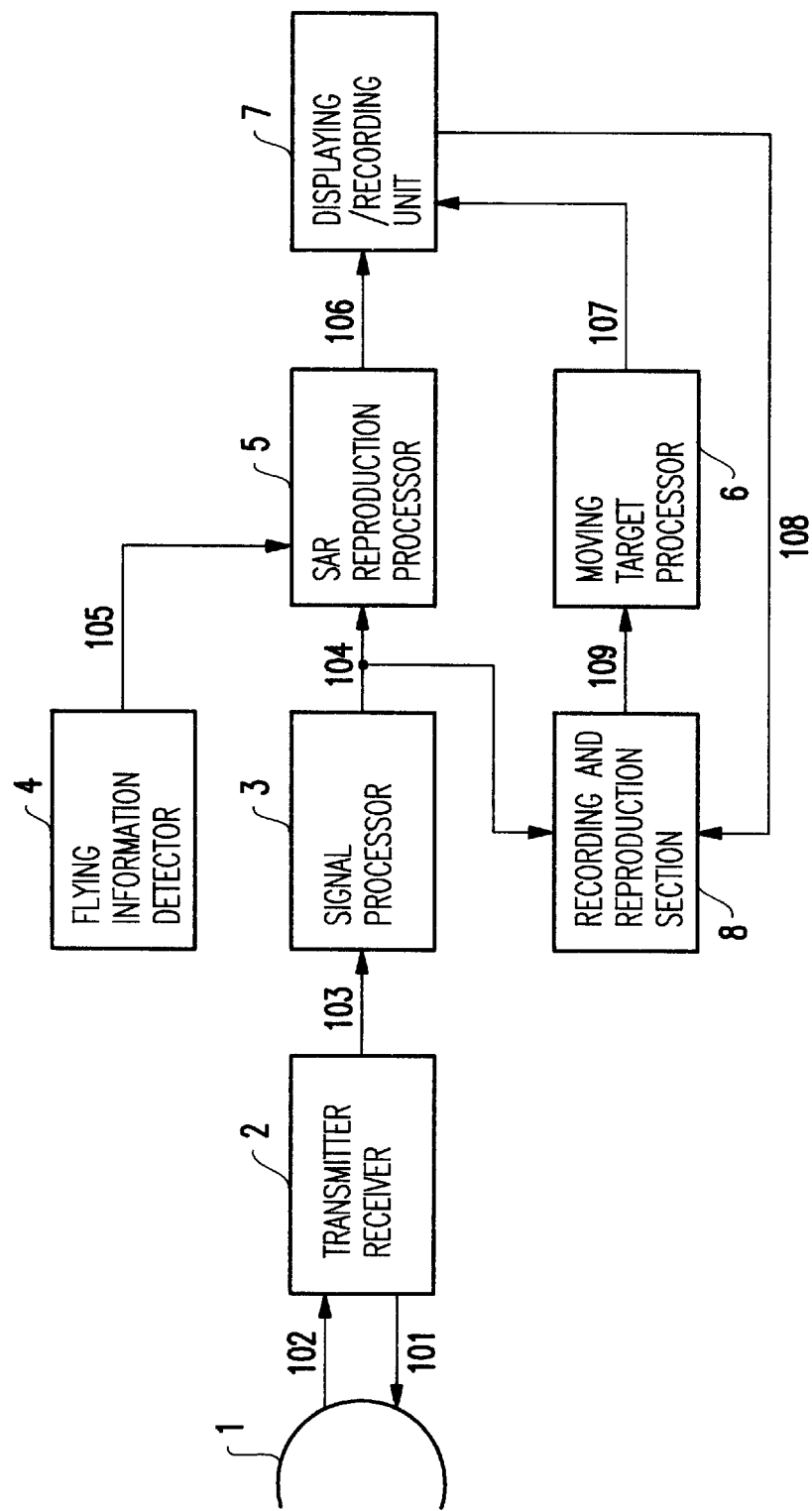
FIG. 2 is a block diagram showing a general construction of a synthetic aperture radar apparatus of an embodiment of the present invention.

FIG. 2 is a block diagram showing a general construction of a synthetic aperture radar apparatus of an embodiment of the present invention.

Referring to FIG. 2, reference numeral 1 denotes an antenna, which radiates a radio wave toward a target on the ground or the sea and receives a reflected wave from the target. Reference numeral 2 denotes a transmitter-receiver, which outputs transmission wave 101 for causing antenna 1 to radiate a radio wave. Transmitter-receiver 2 inputs reception wave 102 received by antenna 1 and outputs video signal 103 in accordance with reception wave 102. Reference numeral 3 denotes a signal processor, which inputs video signal 103 which is a reception output signal from transmitter-receiver 2, processes video signal 103 and outputs output signal 104 (In-phase/Quadrature). Antenna 1, transmitter-receiver 2 and signal processor 3 form an antenna block for acquiring target information.

Reference numeral 4 denotes a flying information detector, which detects the position, velocity, acceleration and oscillations (pitching, rolling and yawing angles) of a flying aircraft and outputs flying information 105. Reference numeral 5 denotes an SAR reproduction processor, which inputs output signal 104 from signal processor 3 and flying information 105 from flying information detector 4, effects known SAR image reproduction processing using the inputs and outputs SAR reproduction data 106.

Reference numeral 8 denotes a recording and reproduction unit, which inputs output signal 104 from signal processor 3 and temporarily stores output signal 104 inputted thereto. Recording and reproduction section 8 also inputs selection signal 108 which will be hereinafter described, reproduces data within a range corresponding to a selection range of selection signal 108 and outputs the reproduced data as selection data 109. Reference numeral 6 denotes a moving target processor, which inputs selection data 109 from recording and reproduction section 8, effects processing for production of a moving target image based on selection data 109 and outputs motion target data 107.

Reference numeral 7 denotes a displaying/recording unit, which inputs SAR reproduction data 106 from SAR reproduction processor 5 and motion target data 107 from moving target processor 6 and causes a monitor (not shown) such as a CRT to display the inputs or causes a recording apparatus (not shown) to record the inputs. Further, displaying/recording unit 7 selects a range from a display based on SAR reproduction data 106 from SAR reproduction processor 5 and outputs the selected range as selection signal 108 to recording and reproduction section 8. The selection of a range here is performed by selecting, for example, from within an image based on SAR reproduction data 106 which is displayed on the monitor, a predetermined area (range) including an aimed moving target. The selection of the display can be performed, for example, by a user using an inputting apparatus such as a mouse. The area selected here corresponds in a one by one corresponding relationship to a data range of the target on data stored in recording and reproduction section 8 (data based on output signal 104 from signal processor 3).

In the SAR apparatus of the present embodiment having the construction described above, when transmission wave 101 is sent out from transmitter-receiver 2 to antenna 1, a radio wave is radiated from antenna 1 toward a moving target on the ground, and a reflected wave of the radio wave is received by antenna 1. When the reflected wave is received by antenna 1, reception wave 102 is sent out from antenna 1 to transmitter-receiver 2, by which it is converted into video signal 103. Video signal 103 obtained by the conversion by transmitter-receiver 2 is inputted to and signal processed by signal processor 3 and outputted as output signal 104 from signal processor 3. Output signal 104 outputted from signal processor 3 is inputted to and subject to the following processing by SAR reproduction processor 5 and recording and reproduction section 8.

SAR reproduction processor 5 to which output signal 104 is inputted effects known SAR image reproduction processing using inputted output signal 104 and flying information 105 detected by flying information detector 4 and outputs a result of the processing (SAR reproduction data 106) to displaying/recording unit 7. On the other hand, recording and reproduction section 8 to which output signal 104 is inputted temporarily stores output signal 104 inputted thereto.

When SAR reproduction data 106 outputted from SAR reproduction processor 5 are inputted to displaying/recording unit 7, displaying/recording unit 7 causes SAR reproduction data 106 inputted thereto to be displayed on the screen of the monitor and to be recorded by the recording apparatus. Here, if a range in which the moving target is included is selected from within the display of SAR reproduction data 106 on the screen of the monitor, then a result of the selection (selection signal 108) is outputted to recording and reproduction section 8.

When selection signal 108 is inputted to recording and reproduction section 8, recording and reproduction section 8 reproduces those data within a range corresponding to the range of selection signal 108 from within output signal 104 recorded therein and outputs a result of the reproduction (selection data 109) to moving target processor 6.

When selection data 109 are inputted to moving target processor 6, moving target processor 6 performs moving target processing using selection data 109 inputted thereto and outputs a result of the moving target processing (motion target data 107) to displaying/recording unit 7. Displaying/recording unit 7 causes motion target data 107 inputted thereto to be displayed on the screen of the monitor and to be recorded by the recording apparatus.

As described above, the SAR apparatus of the present embodiment can obtain, while obtaining an SAR process image, a moving target process image from the data recorded in recording and reproduction section 8 by moving target processor 6. The most characteristic construction of the SAR apparatus of the present embodiment resides in the moving target processing by moving target processor 6. In the following, a concrete construction of moving target processor 6 is described in detail.

FIG. 3 is a block diagram showing an example of a construction of moving target processor 6. Moving target processor 6 shown includes means (correction means) including range compression unit 11, recording/reproduction unit 12, phase correction unit 13, Doppler frequency analysis unit 14 and switching unit 15 for removing components of a Doppler frequency $F_D$(aircraft), FFT operation/image production unit 16, and means (selection means) including recording/reproduction unit 17, image selection unit 18, range direction motion component analysis unit 19 and switching unit 20 for removing a range direction component. The individual components are described in detail below.

Range compression unit 11 inputs selection data 109 from recording and reproduction section 8, effects known range compression processing for selection data 109 inputted thereto and outputs range compression output data 201. Range compression output data 201 in this instance are complex data represented generally by $a \cdot xp(j\theta r(T))$ (a: amplitude, $\theta r(T)$: movement within time T).

Recording/reproduction unit 12 inputs range compression output data 201 outputted from range compression unit 11, temporarily records range compression output data 201 inputted thereto, reproduces range compression output data 201 and outputs range compression data 202. Further, from recording/reproduction unit 12, control signal 204 representative of a stored amount of the recorded data is outputted to Doppler frequency analysis unit 14, and reproduction of the recorded data is performed in response to reproduction control signal 205 from Doppler frequency analysis unit 14.

Switching unit 15 inputs range compression data 202 outputted from recording/reproduction unit 12, and an output of switching unit 15 is inputted to phase correction unit 13 and Doppler frequency analysis unit 14. Switching unit 15 includes a switch, which is switched in response to reproduction control signal 205 from Doppler frequency analysis unit 14 which will be hereinafter described so that range compression data 202 reproduced by recording/reproduction unit 12 are outputted to phase correction unit 13 or Doppler frequency analysis unit 14.

Figure 4A:
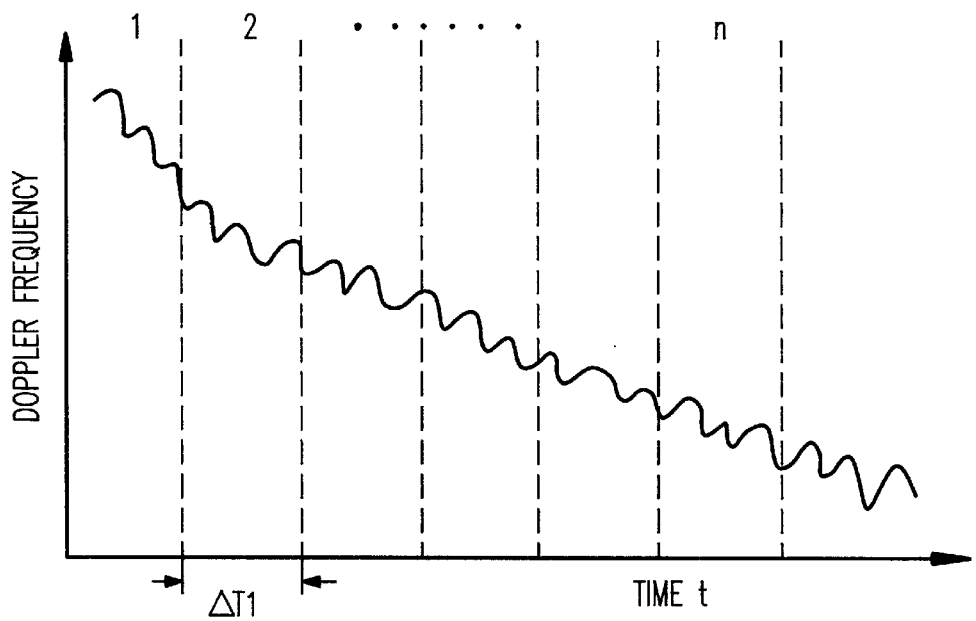
FIGS. 4A and 4B are graphs illustrating processing effected by an FFT operation/image production unit.
Figure 4B:
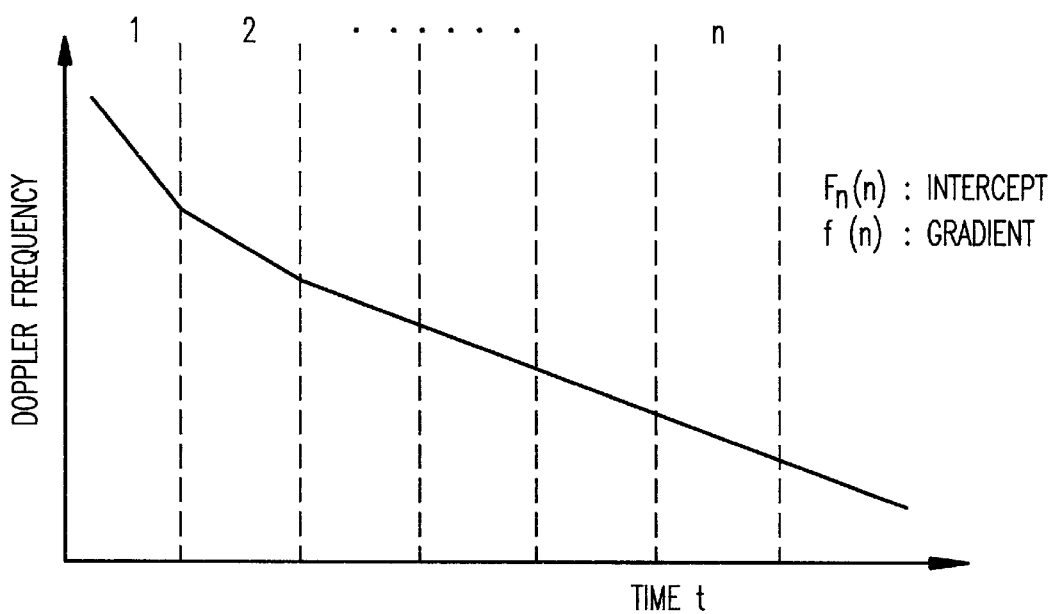

Doppler frequency analysis unit 14 receives range compression data 202 outputted form recording/reproduction unit 12 via switching unit 15, effects known Doppler frequency analysis processing for range compression data 202 inputted thereto after each suitable ΔWT1 time, and then performs such FFT processing as seen in FIGS. 4A and 4B, after which it outputs a result of the FFT processing (Doppler frequency data 206) to phase correction unit 13. Further, Doppler frequency analysis unit 14 controls switching of switching unit 15 of recording/reproduction unit 12 in the following manner. In particular, if the data amount of control signal 204 from recording/reproduction unit 12 exceeds a predetermined reference amount, then Doppler frequency analysis unit 14 outputs switching control signal 203 to switchably connect the switch of switching unit 15 to Doppler frequency analysis unit 14 side and outputs reproduction control signal 205 to recording/reproduction unit 12 to reproduce the data stored at present. Further, if the Doppler frequency analysis processing is completed, Doppler frequency analysis unit 14 outputs switching control signal 203 to switchably connect the switch to phase correction unit 13 side and outputs reproduction control signal 205 to recording/reproduction unit 12 to effect reproduction of the data again. The outputting of Doppler frequency data 206 from Doppler frequency analysis unit 14 is performed in synchronism with reproduction of range compression data 202 of recording/reproduction unit 12. Doppler frequency data 206 include Doppler center frequency FD(n) calculated after each $\Delta$WT1 time and change rate f(n) (n=1, 2, ... ) of the Doppler center frequency within an interval of $\Delta$Wt.

Phase correction unit 13 calculates phase $\phi$ produced by a movement of the platform included in range compression data 202 using the following expression (5):

$$\phi(n,T) = 2\pi \int_{TB}^{T} (FD(n) + f(n)t)dt \qquad (4)$$

$$= 2\pi \left[ \frac{1}{2} f(n)(T^2 - TB^2) + FD(T - TB) \right]$$

Then, phase correction unit 13 corrects range compression data 202 with following expression (5) using $\phi$d(n) obtained with expression (4) above and outputs a result of the correction (phase correction data 207).

$$Z(T)=a\cdot\exp(j\theta(T))\cdot\exp(-j\theta(n, T)) \qquad (5)$$

where Z(T) is range compression data (complex number) after the correction.

Figure 5:
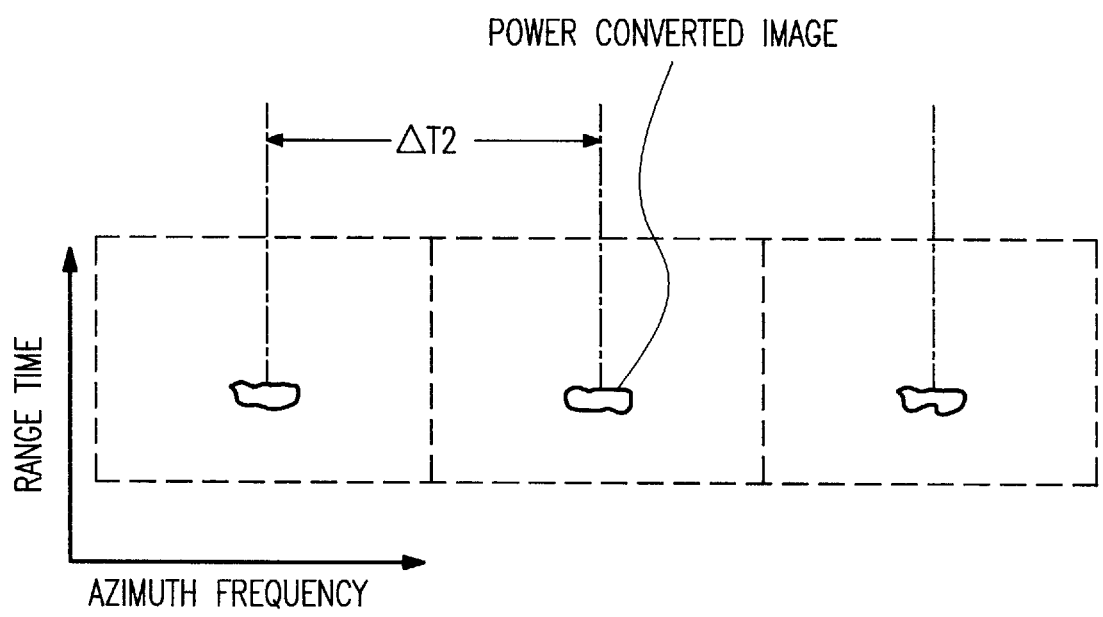
FIG. 5 is a schematic view illustrating processing effected by a range direction motion component analysis unit.

FFT operation/image production unit 16 effects FFT (N points) of phase correction data 207 at intervals of $\Delta$WT2 in the azimuth directions to produce, after each interval of $\Delta$WT2, an image represented, for example, by such a range time-azimuth frequency as illustrated in FIG. 5, and outputs the image as frequency region image data 208. Frequency region image data 208 are represented by the following expression in which Doppler frequency FD(aircraft) is removed from expression (3) above:

$$FD(TOTAL)=Gx(rx, \omega x)+Gy(ry, \omega y)+Gz(rz, \omega z) \qquad (6)$$

Recording/reproduction unit 17 inputs frequency region image data 208 (power converted image of FIG. 5) outputted from FFT operation/image production unit 16, and temporarily records the data inputted thereto, reproduces the data and outputs frequency region image data 209. Further, control signal 211 representative of the stored amount of the recorded data is outputted from recording/reproduction unit 17 to range direction motion component analysis unit 19, and the reproduction of the recorded data is performed in response to reproduction control signal 205 from range direction motion component analysis unit 19.

Switching unit 20 inputs frequency region image data 209 outputted from recording/reproduction unit 17, and an output thereof is inputted to image selection unit 18 and range direction motion component analysis unit 19. In this switching unit 20, the switch is switched in response to switching control signal 210 from range direction motion component analysis unit 19, which will be hereinafter described, so that frequency region image data 209 reproduced by recording/reproduction unit 17 are outputted to image selection unit 18 or range direction motion component analysis unit 19.

Range direction motion component analysis unit 19 inputs frequency region image data 209 outputted from recording/reproduction unit 17 via switching unit 20, calculates time t' based on frequency region image data 209 inputted thereto and outputs it as selection signal 213. This time t' can be calculated, for example, in the following manner.

Figure 6A:
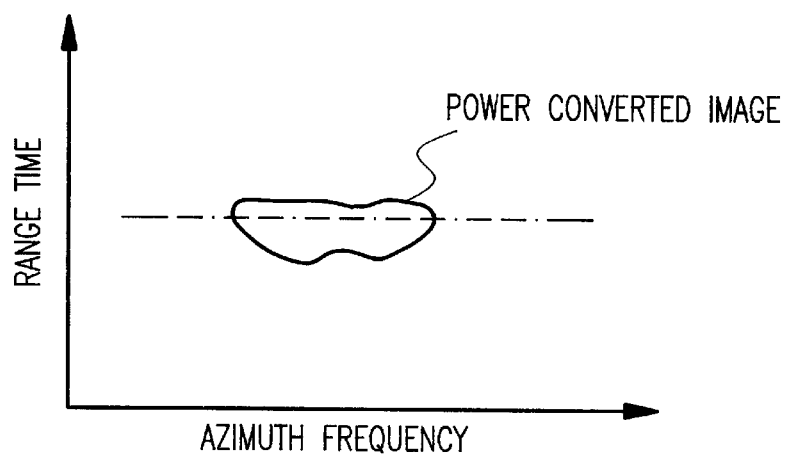
FIGS. 6A, 6B and 6C are graphs illustrating the processing effected by the range direction motion component analysis unit.
Figure 6B:
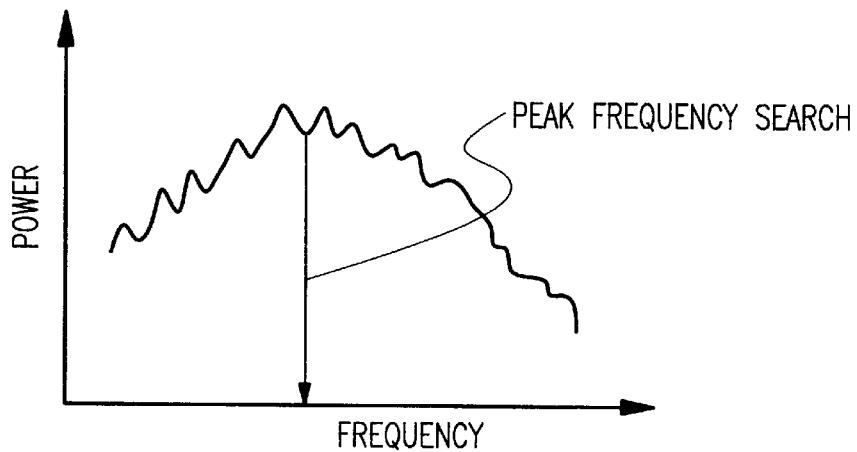
Figure 6C:
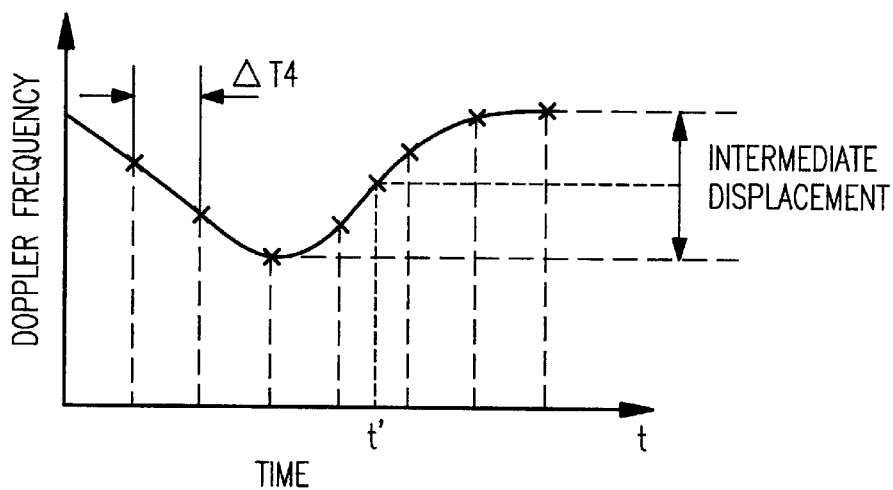

As seen from FIGS. 6A and 6B, range direction motion component analysis unit 19 first calculates azimuth frequencies (Doppler frequencies) with which power converted images reproduced by recording/reproduction unit 17 exhibit a peak in power value within a predetermined range time (peak frequency search). This processing is performed for each power converted image at each time reproduced by recording/reproduction unit 17 to calculate a displacement of the Doppler frequencies of the image. Then, in FIG. 6C, integration processing is performed the result of the calculation after each suitable $\Delta$T4 time to detect time t' at which an intermediate displacement within a displacement section which is defined by a maximum value and a minimum value of the displacements in Doppler frequency is exhibited (calculation of the time of the intermediate displacement).

In addition, range direction motion component analysis unit 19 controls the reproduction of recording/reproduction unit 17 and the switching of the switch of switching unit 20 in the following manner. In particular, if the data amount of control signal 211 from recording/reproduction unit 17 exceeds a predetermined reference amount, then range direction motion component analysis unit 19 outputs switching control signal 210 to connect the switch of switching unit 20 to range direction motion component analysis unit 19 side and outputs reproduction control signal 212 to reproduce the data stored at present. Further, range direction motion component analysis unit 19 outputs, after completion of the Doppler frequency analysis processing, switching control signal 210 to connect the switch to image selection unit 18 side and outputs reproduction control signal 212 to recording/reproduction unit 17 to perform reproduction of the data again. It is to be noted that the outputting of selection signal 213 from range direction motion component analysis unit 19 is performed in synchronism with the reproduction of frequency region image data 209 of recording/reproduction unit 17.

Image selection unit 18 inputs frequency region image data 209 outputted from recording/reproduction unit 17 via switching unit 20, selects an image at a time indicated by selection signal 213 from range direction motion component analysis unit 19 from among frequency region image data 209 and outputs a result of the selection as motion target processing output data 107.

What is claimed is:

1. A synthetic aperture radar (SAR) apparatus comprising:
    an antenna block provided on a flying body for radiating a radio wave toward a target and receiving a reflected wave of the radio wave to acquire information regarding the target;
    flying information detection means for detecting flying information of the flying body;
    SAR reproduction processing means for effecting SAR reproduction processing based on the target information acquired by said antenna block and the flying information detected by said flying information detector means;

displaying and recording means for displaying and recording a result of the SAR reproduction processing of said SAR reproduction processing means,;

recording and reproduction means for recording the target information acquired by said antenna block and reproducing the data in a designated range from the recorded information; and moving target processing means for analyzing Doppler frequency displacements arising from a range direction motion component of the target and motion components of the flying body from the data reproduced by said recording and reproduction means and producing a moving target image wherein only azimuth direction motion components of the target are converted into Doppler components;

said displaying and recording means outputting a predetermined range designated from within the display of said SAR reproduction processing means and including the target as a designated range to said recording and reproduction means so as to effect display and recording of the motion target image produced by said moving target processing means.

2. A synthetic aperture radar apparatus as claimed in claim 1, wherein said moving target processing means includes:

range compression processing means for effecting compression in the range direction of the data reproduced by said recording and reproduction means;

correction means for analyzing Doppler frequency displacements arising from motion components of the flying body from the range compression data compression processed by said range compression processing means to effect phase correction of the range compression data;

image production means for converting azimuth direction motion components of the range compression data corrected by said correction means into Doppler components to produce motion target images at a plurality of successive times; and selection means for analyzing the Doppler frequency displacements arising from the range direction motion components from the moving target images at the successive times produced by said image production means to select a moving target image which exhibits a minimum one of the displacements.

3. A synthetic aperture radar (SAR) apparatus which includes an antenna block provided on a flying body for radiating a radio wave toward a target and receiving a reflected wave of the radio wave to acquire information regarding the target, flying information detection mean for detecting flying information of the flying body, SAR reproduction processing means for effecting SAR reproduction processing based on the target information acquired by said antenna block and the flying information detected by said flying information detector means, and displaying and recording means for displaying and recording a result of the SAR reproduction processing of said SAR reproduction processing means, comprising:

recording and reproduction means for recording the target information acquired by said antenna block and reproducing the data in a designated range from the recorded information; and moving target processing means for analyzing Doppler frequency displacements arising from a range direction motion component of the target and motion components of the flying body from the data reproduced by said recording and reproduction means and producing a moving target image wherein only azimuth direction motion components of the target are converted into Doppler components;

said displaying and recording means outputting a predetermined range designated from within the display of said SAR reproduction processing means and including the target as a designated range to said recording and reproduction means so as to effect display and recording of the motion target image produced by said moving target processing means;

wherein said moving target processing means includes:

range compression processing means for effecting compression in the range direction of the data reproduced by said recording and reproduction means;

correction means for analyzing Doppler frequency displacements arising from motion components of the flying body from the range compression data compression processed by said range compression processing means to effect phase correction of the range compression data; image production means for converting azimuth direction motion components of the range compression data corrected by said correction means into Doppler components to produce motion target images at a plurality of successive times; and selection means for analyzing the Doppler frequency displacements arising from the range direction motion components from the moving target images at the successive times produced by said image production means to select a moving target image which exhibits a minimum one of the displacements; and wherein said correction means includes:

compression result recording and reproduction means for recording results of the compression processing of said range compression processing means in a time series and reproducing the recorded data in response to a reproduction control signal;

first switching means for switching a destination of outputting of said compression result recording and reproduction means in response to a switching control signal;

Doppler frequency analysis means for analyzing the Doppler frequency displacements arising from the motion components of the flying body based on the range compression data reproduced by said compression result recording and reproduction means; and phase correction means for effecting phase correction of the range compression data reproduced by said compression result recording and reproduction means based on results of the Doppler frequency analysis effected by said Doppler frequency analysis means; and wherein said selection means includes:

image recording and reproduction means for recording the moving target images at the different times produced by said image production means in a time sent's and reproducing the recorded moving target images in response to a reproduction control signal;

second switching means for switching a destination of outputting of said image recording and reproduction means in response to a switching control signal;

range direction rotational motion analysis means for analyzing Doppler frequency displacements arising from the range direction motion components from the moving target images reproduced by said image recording and reproduction means and outputting a time of an intermediate displacement in a displacement section which is defined by a maximum value and a minimum value of the displacements; and image selection means for selecting an image at the time outputted from said range direction rotational motion analysis means from among the moving target images reproduced by said image recording and reproduction means;

said Doppler frequency analysis means outputting, when a recorded amount of said compression result recording and reproduction means reaches a predetermined amount, a reproduction control signal to said compression result recording and reproduction means to effect reproduction of the recorded data and further outputting a switching control signal to said first switching means to switch the destination of outputting of said compression result recording and reproduction means to said Doppler frequency analysis means, but outputting, when the Doppler frequency analysis is performed, a switching control signal to said first switching means to switch the destination of outputting of ;aid compression result recording and reproduction means to said phase correction means and further outputting a reproduction control signal to said compression result recording and reproduction means to effect re-reproduction of the recorded data;

said range direction rotational motion analysis means outputting, when the recorded amount of said image recording and reproduction means reaches the predetermined amount, a reproduction control signal to said image recording and reproduction means to effect reproduction of the recorded data and further outputting a switching control signal to said second switching means to switch the destination of outputting of said image recording and reproduction means to said range direction rotational motion analysis means, but outputting, when the range direction rotational motion analysis is effected, outputting a switching control signal to said second switching means to switch the destination of outputting of said image recording and reproduction means to said selection means and further outputting a reproduction control means to said image recording and reproduction means to effect re-reproduction of the recorded.

4. A target image reproduction method comprising the steps of:

radiating a radio wave from a flying body toward a target;

receiving a reflected wave of the radio wave to acquire information regarding the target; and producing a target image from the acquired target information and flying information regarding the flying body, wherein Doppler frequency displacements arising from a range direction motion component of the target and motion components of the flying body are analyzed to produce a target image wherein only azimuth direction motion components of the target are converted into Doppler components.

5. A target image reproduction method wherein a radio wave is radiated from a flying body toward a target and a reflected wave of the radio wave is received to acquire information regarding the target, and a target image is produced from the acquired target information and flying information regarding the flying body, comprising:

the first step of recording the target information;

the second step of effecting SAR reproduction processing based on the target information and the flying information;

the third step of designating a target range from an image SAR reproduced in the second step;

the fourth step of reproducing, from the target information stored in the first step, data corresponding to the target range designated in the third step; and the fifth step of analyzing Doppler frequency displacements arising from range direction motion components of the target and motion components of the flying body from the data reproduced in the fourth step to produce a motion target image wherein only azimuth direction motion components of the target are converted into Doppler components.

6. A target image reproduction method wherein a radio wave is radiated from a flying body toward a target and a reflected wave of the radio wave is received to acquire information regarding the target, and a target image is produced from the acquired target information and flying information regarding the flying body, comprising:

the first step of recording the target information;

the second step of effecting SAR reproduction processing based on the target information and the flying information;

the third step of designating a target range from an image SAR reproduced in the second step;

the fourth step of reproducing, from the target information stored in the first step, data corresponding to the target range designated in the third step; and the fifth step of effecting compression in a range direction of the data reproduced in the fourth step and analyzing Doppler frequency displacements arising from the motion components of the flying body from the compression processed range compression data to effect phase correction of the range compression data;

the sixth step of converting the azimuth direction motion components of the range conversion data phase corrected in the fifth step into Doppler components to produce motion target images at a plurality of successive times; and the seventh step of analyzing the Doppler frequency displacements arising from the range direction motion components of the motion target images at the different times produced in the sixth step to select a motion target image which exhibits a minimum one of the displacements.

7. A target image production method as claimed in claim 6, wherein the selection of a motion target image in the seventh step is performed by selecting an image of an intermediate displacement in a displacement section which is defined by a minimum one and a maximum one of the Doppler frequency displacements arising from the range direction motion component.

* * * * *